United States Patent [19]

Koberg

[11] Patent Number: 5,269,354
[45] Date of Patent: Dec. 14, 1993

[54] FLUID RECOVERY DEVICE

[76] Inventor: Leslie R. Koberg, 420 Shepard Dr., Marietta, Ga. 30064

[21] Appl. No.: 989,121

[22] Filed: Dec. 11, 1992

[51] Int. Cl.⁵ .................. B65B 1/04; B65B 3/04; B67C 3/02
[52] U.S. Cl. .................. 141/106; 141/114; 141/332; 141/344; 141/363; 248/311.3
[58] Field of Search .................. 141/105–107, 141/114, 165, 312, 331, 332, 335, 340, 344, 346, 351, 353, 354, 355, 357, 363, 364, 375; 215/272, 273, 274; 248/311.3, 200

[56] References Cited

U.S. PATENT DOCUMENTS

| 947,917 | 2/1910 | Kollenberg | 141/331 |
|---|---|---|---|
| 2,071,944 | 2/1937 | Hoffman | 221/69 |
| 2,230,180 | 1/1941 | Collins | 221/69 |
| 2,250,910 | 7/1941 | Hiett | 221/69 |
| 2,337,292 | 12/1943 | Champion | 221/69 |
| 2,369,982 | 2/1945 | Richards | 211/134 |
| 2,575,809 | 11/1951 | Hankins | 222/112 |
| 2,587,779 | 3/1952 | Smith | 222/112 |
| 2,600,770 | 6/1952 | Hofacer | 222/112 |
| 2,643,030 | 6/1953 | Lyon | 222/112 |
| 2,728,488 | 12/1955 | Hankins | 222/112 |
| 2,743,039 | 4/1956 | Smith | 222/112 |
| 2,767,744 | 10/1956 | Beerman | 141/332 |
| 2,781,065 | 2/1957 | Hofacer | 141/106 |
| 3,156,270 | 11/1964 | Erickson | 141/106 |
| 3,192,970 | 7/1965 | Allen | 141/106 |
| 4,516,684 | 5/1985 | Walter | 215/272 |
| 4,832,095 | 5/1989 | Bonnell | 141/106 |

Primary Examiner—Henry J. Recla
Assistant Examiner—Steven O. Douglas
Attorney, Agent, or Firm—Jason A. Bernstein

[57] ABSTRACT

A device for recovering oil from a plurality of open mouthed containers comprising a funnel having a plurality of openings at its upper end and an outlet port at its lower end. The outlet port is threaded to receive a collection container, such as a plastic oil container. The upper end of the funnel has a plurality of spaced openings, each opening has associated with it a ring having a plurality of vertical ribs spaced around the interior circumference for releasably retaining the neck of a container by a pressure fit. Each ring has a removable cap removably attachable to it for covering an opening not in use, thereby preventing dirt from entering the funnel. A set of braces having a mounting plate extends from the funnel for securing the device to a wall. An optional valve permits closure of the outlet port when a recovery container is removed, thereby preventing fluid from leaking out of the device.

8 Claims, 4 Drawing Sheets

Fig_4

FLUID RECOVERY DEVICE

FIELD OF THE INVENTION

The present invention relates to fluid collection devices, and more particularly, to a device for recovering oil or other fluids from a plurality of containers.

BACKGROUND OF THE ART

Changing the oil in a car or other engine typically involves emptying a number of one quart plastic oil containers into the engine crankcase. Since an average car accepts on the average of four to six quarts, and airplanes can accept even more, a number of the containers are used. Oil is a viscous fluid tending to flow slowly, requiring a long period of time to drain the last amounts of oil from the walls of the inverted container. Most oil changes are viewed as short term activities and people are reluctant to wait any appreciable time while the container relinquishes its last drop. Nevertheless, many mechanics shops are aware that by hurriedly draining the bulk of the oil and disposing of the container wastes oil. The amount of wasted oil per container is small, but in a facility that uses large amounts of oil, such as a car repair shop or an airplane maintenance hanger, the accumulated amount of wasted oil can be appreciable. It would be desirable to have a device for recovering this otherwise wasted oil.

Prior art devices exist for draining and collecting oil from a plurality of oil cans. Many of these devices are designed for use with the old style cylindrically shaped puncture cans, which are obsolete in most areas. Newer containers are more efficiently designed, with squared sides and necks with screw caps for easier use.

One of the problems with prior art devices is that they fail to adequately prevent dirt and other contamination from entering the funnel or drainage system and mixing with the oil. Dirt of other particulate matter or diluents in oil can substantially reduce its effectiveness, or even cause damage to the engine. U.S. Pat. No. 4,832,095, issued to Bonnell, discloses a device for collecting viscous fluids having a two-by-three array of openings for draining cylindrical or box shaped oil containers. Bonnell has a cover that protects the entire funnel and all the openings at once. However, it is more likely that the device will remain uncovered while in use, and, if only one or less than all of the openings are in use, dirt can still enter the funnel. Previous devices have attempted to address the contamination issue, but have failed to provide a convenient closure means that would allow some of the openings to be in use while others to be capped off.

SUMMARY OF THE INVENTION

The present invention provides a device for simultaneously recovering fluid from at least one container, comprising a funnel member having an open upper portion, a narrower lower portion, and a generally vertical wall portion connecting the upper and the lower portions, at least part of the wall portion sloping inwardly; an outlet port defined by the lower portion, the port having a set of threads capable of removably receiving a recovery container having mating threads; a cover associated with the upper portion having at least one opening defined therein; at least one retainer means associated with the cover for releasably holding the container, comprising a ring with an opening define therein and having at least one rib disposed vertically along the inner circumference of the ring for providing a pressure fit with the container, the ring being attached to and in fluid communication with the upper portion of the funnel member; and means for mounting the device to a vertical surface comprising at least one support member extending generally perpendicularly outward from the wall portion and having at its distal end an elongated mounting member having at least one U-shaped opening defined therein for accepting a mounting means. At least one removable cap is provided for preventing entry of dirt into the retainer means, each cap frictionally engaging the outer circumference of each ring. The removable cap is connected to the cover by a flexible connecting tab means.

Optionally, the outlet port has a valve therein for preventing the flow of fluid out from the port when no recovery container is attached to the device.

Accordingly, it is a principal object of the present invention to provide a device for recovering and collecting fluids from a plurality of containers.

It is another object of the present invention to provide a device for collecting residual amounts of oil from used oil containers and collecting the oil in a standard oil container for reuse.

It is yet another object of the present invention to provide a device having a plurality of openings in fluid communication with a common funnel capable of draining fluids into a container.

It is still another object of the present invention to provide a device for collecting oil having a plurality of openings and a removable cover for each opening to permit usage of one or more of the openings while covering the others and preventing contamination of the funnel and oil with dirt.

DESCRIPTION OF THE PREFERRED EMBODIMENTS

Figure 1:
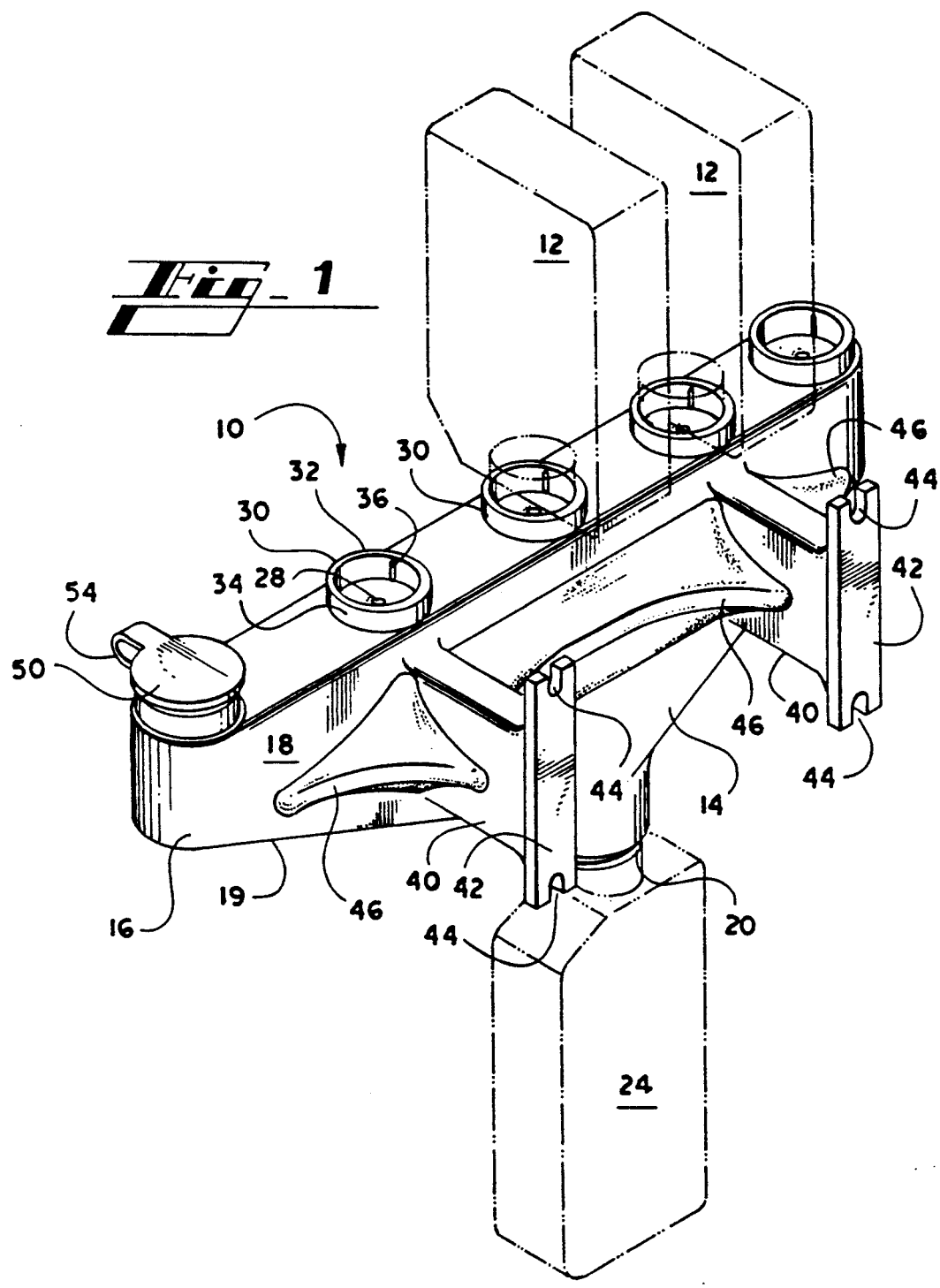
FIG. 1 is a perspective view showing the fluid recovery device of the present invention with a collection container shown in phantom and a container mounted to the device in a draining position shown in phantom.

Referring to the drawings in which like numerals describe like parts throughout the several figures, FIG. 1 shows a fluid recovery device noted generally as 10 for draining one or more oil containers 12 having a neck 13. For the purposes of this disclosure the container 12 will be discussed as being a standard one quart motor oil container having four sides. It is to be understood that other sizes and shapes of containers and other fluids are contemplated as being usable in accordance with the present invention. An upper portion 16 defines a funnel 14 having generally vertical front and back walls 17 and 18 and inward sloping side walls 19. At its lower portion the funnel 14 has an outlet port 20 through which fluid can drain. The port 20 has a set of internal threads (not shown) which enables a container 12, having a standard set of external threads, to be removably attached to the port 20. Thus, a used oil container 24 can be threaded into the port 20 and serve as a recovery container, obviating the need for separate special recovery containers. Alternatively, a pressure fit or other common attachment means may be utilized.

Figure 3:
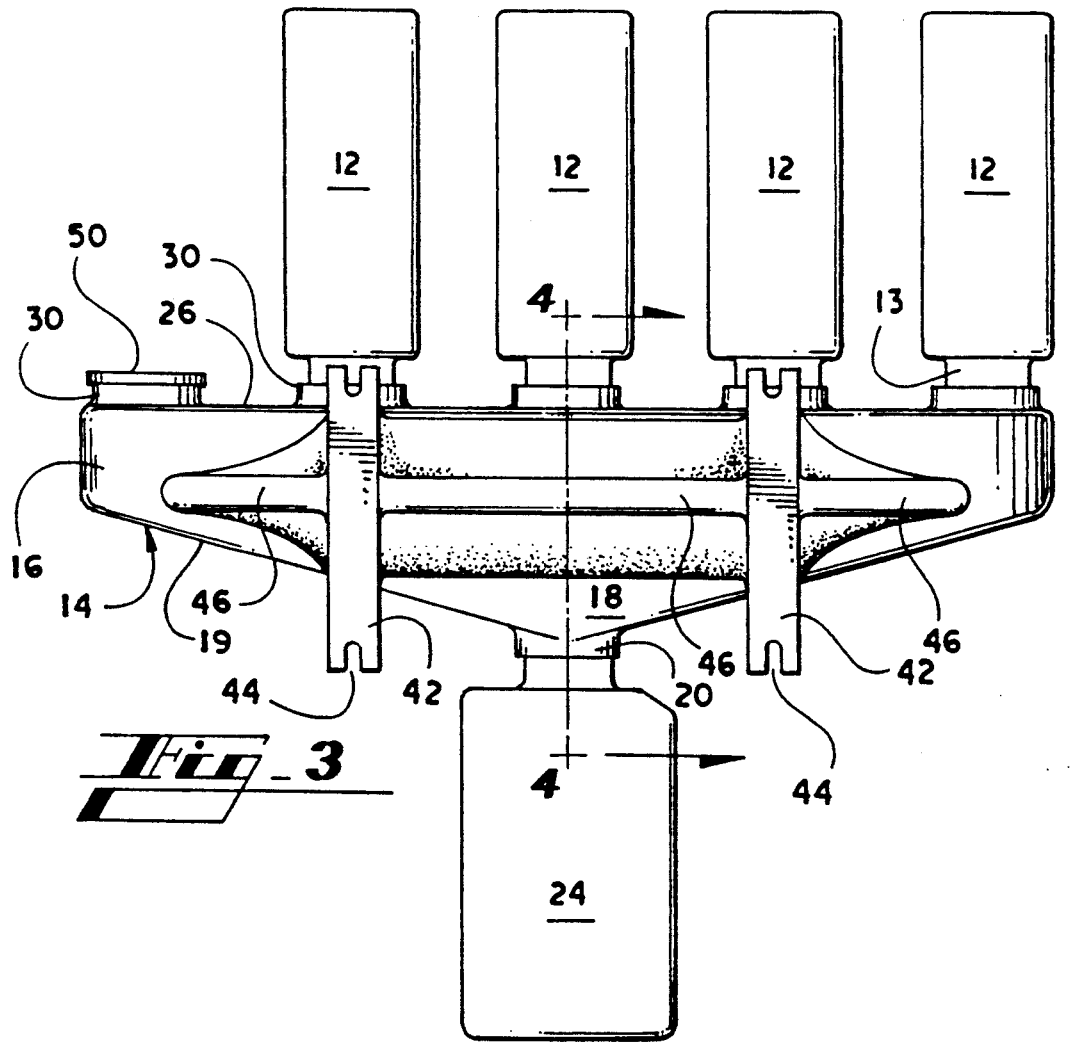
FIG. 3 is a side elevational view of the present invention showing a plurality of containers draining into the device and a collection container attached to the device.
Figure 4:
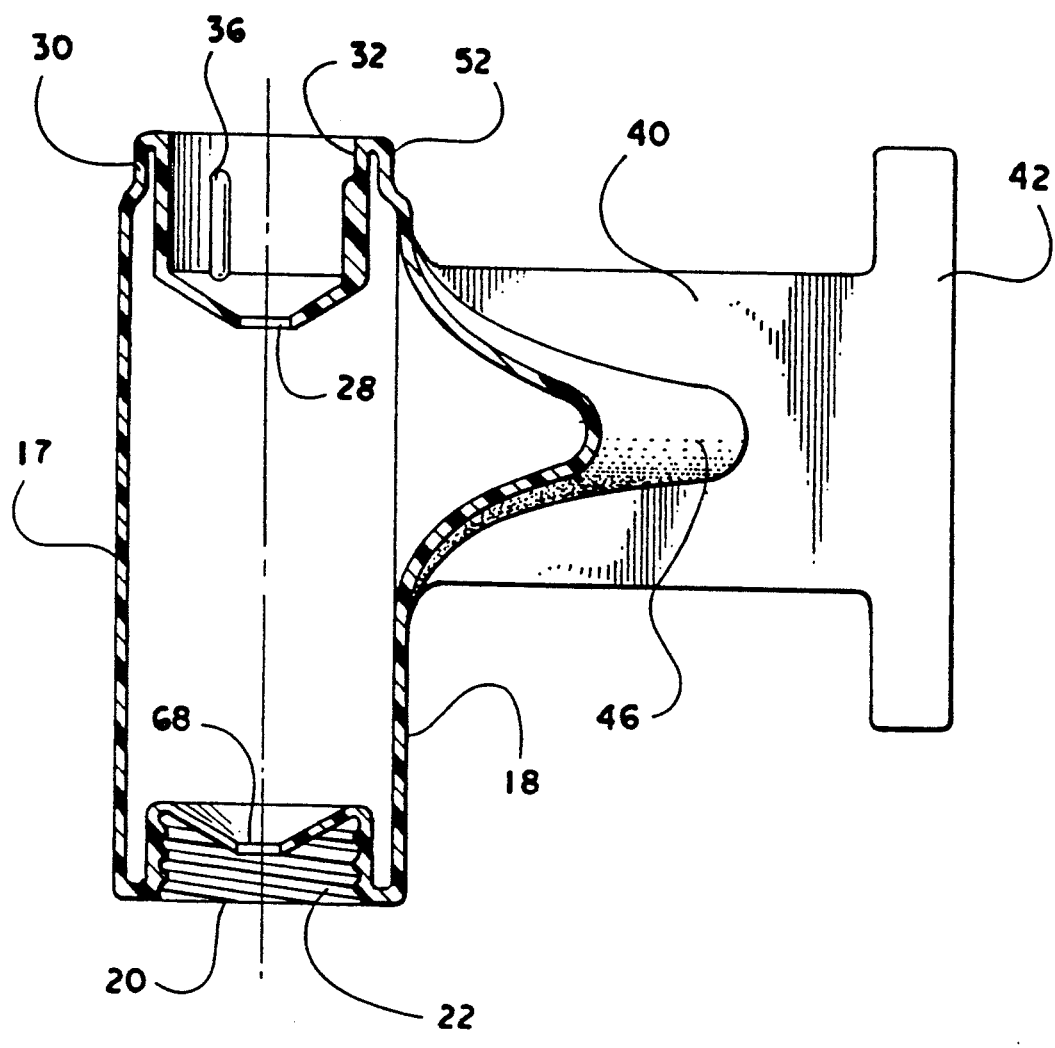
FIG. 4 is a side cutaway view of the device.
Figure 5:
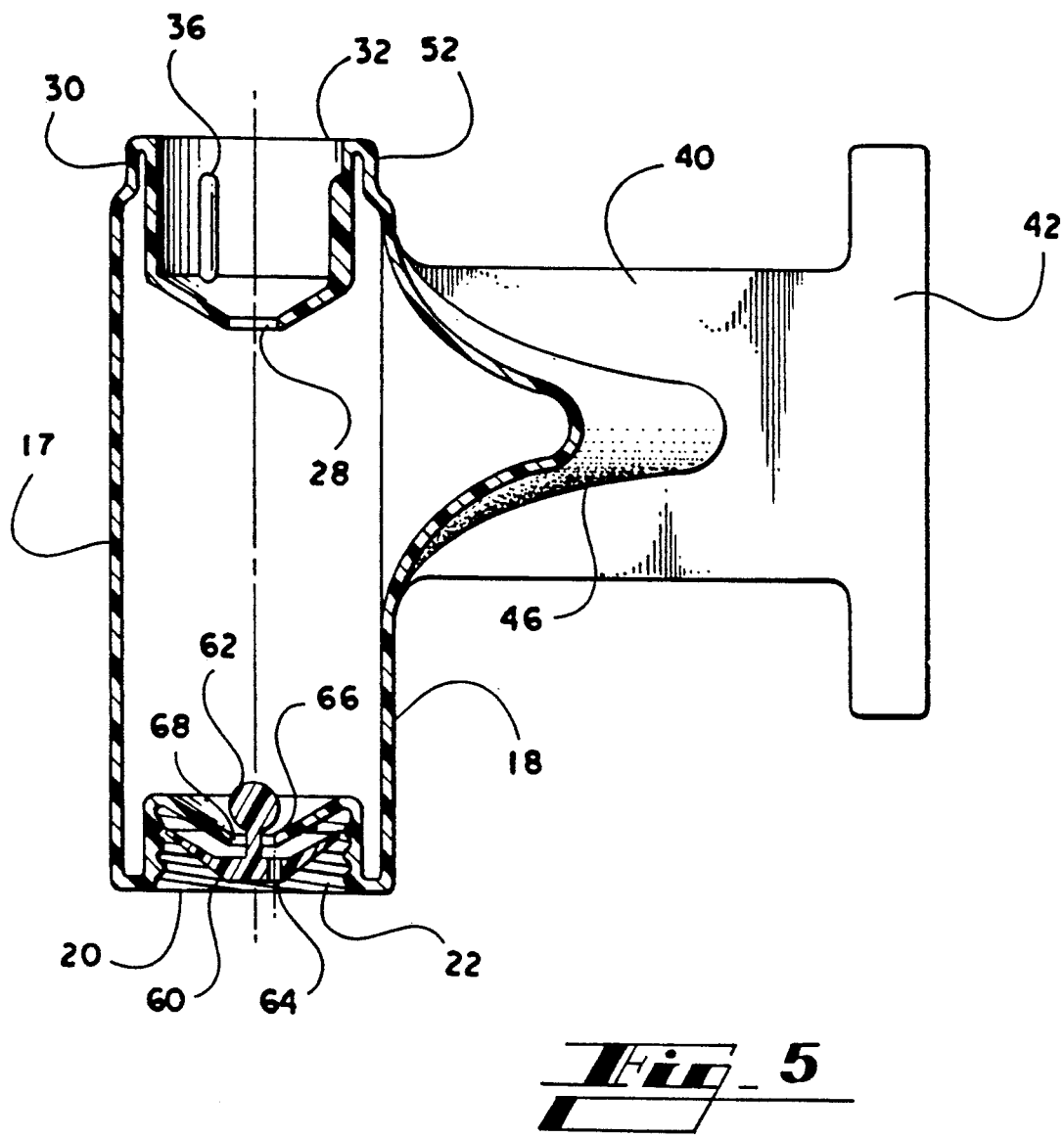
FIG. 5 is a side cutaway view of the device showing the optional valve.

A top portion 26 of the funnel 14 is a generally flat elongated member attached or formed with the funnel 14 as part of the device 10. The top portion 26 has a plurality of openings 28 which permit fluid to drain into the funnel 14. Surrounding each opening 28 and extending from the top portion 26 is a retaining member comprising a raised generally circular ring 30 having an inner circumference 32 and an outer circumference 34. The inner circumference 32 is preferably sized to receive by a pressure fit a standard sized neck of the container 12. It is to be understood that other size circumferences can be used with other types of containers. Similarly, while five openings are shown in the drawings, fewer or more openings can be used as desired. Preferably, the surface 35 of the top portion (shown in FIG. 3 in phantom) slopes downward from the inner circumference 32 to the opening 28 to facilitate downward flow of fluid.

Figure 2:
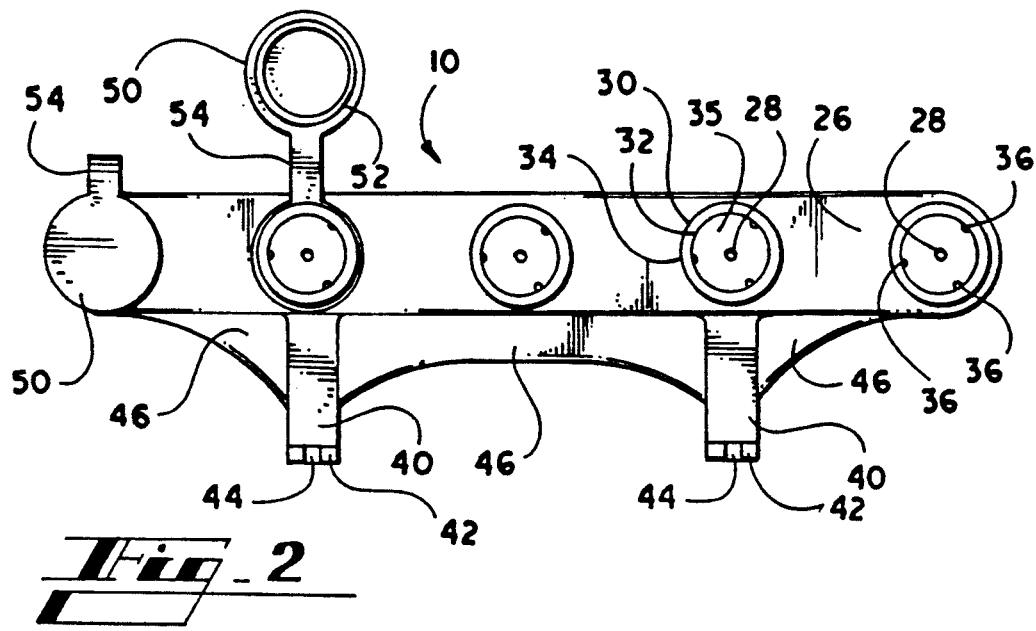
FIG. 2 is top view of the fluid recovery device of the present invention showing a plurality of removable caps.

As shown in FIGS. 1 and 2, at least one and preferably a plurality of elongated ribs 36 are disposed vertically around the inner circumference 32. The ribs 36 create a tighter pressure fit with the neck of the container 12 by causing the neck to be slightly deformed around the rib 36 when inserted into the retaining ring 30. This also provides an improved fit where there are slight variances in the diameter of the container neck.

A pair of braces 40 extend generally perpendicularly outward from the back wall 18 and are used in securing the device 10 to a wall or other structure. Each brace 40 terminates at its distal end in a generally flat elongated mounting plate 42. The plate 42 has at both ends a U-shaped notch 44 capable of receiving a mounting means, such as a screw, bolt, nail, hook or the like that is mounted to a support surface. The braces 40 maintain the device 10 away from the wall so that containers 12 can conveniently be connected to the retaining rings 30 and the outlet port 20. A set of fillets 46 are disposed between and connecting the back wall 18 and the braces 40, which provide structural support and stability to the device 10.

A detachable cap 50 is sized to pressure fit over the outer circumference 34. As shown in FIG. 2, a lip 52 on the inner portion of the cap 50 enables a user to detach the cap 50 by applying pressure to the attached cap in an upward direction. The cap is secured to the top portion 16 by a connecting tab 54 that is connected to the retaining ring 30 by a cap retaining ring 56 (see FIGS. 1 and 2). In this manner, the cap 50 can be detached from the retaining ring 30 and not be lost. The cap 50 can be moved out of the way, as shown in FIG. 2, when the opening 28 is in use. The cap 50 is employed to prevent dirt, dust or other contaminants from entering the openings 28, which might otherwise enter the funnel and contaminate the oil. Each opening 28 has a cap 50 and any combination of openings can be used with the containers 12, while keeping the remaining openings covered and dirt free.

In order to use the present invention the device 10 is mounted preferably on a wall or other stable vertical surface. A user removes a cap 50 covering one of the openings 28 and press fits a container 12 into the retaining ring 30, where it is held in place by the inner circumference 32 and ribs 36. Any oil remaining in the container 12 will flow downward by gravity into the opening 28, into the funnel 14, down the sides of the walls 17, 18, and/or 19, and through the outlet port 20 into the recovery container 24.

Because a number of openings 28 are provided for, one or more containers 12 can be mounted and emptied into the device 10, either individually or several draining simultaneously.

The device is preferably made of molded plastic, but other substances can be used, such as metal, ceramic, wood, sealed paper/cardboard, and the like.

Optionally, the device can incorporate a valve assembly 60 for preventing the flow of fluid out of the outlet port 20 when a recovery container 24 is removed and there is residual fluid left in the device 10. The valve 60 comprises a ball 62 and a flange 64, which are connected by a stem 66. The ball 62 is sized to be slightly larger than an outlet aperture 68 in outlet port 20. The ball 62 can be snap fit or otherwise movably mounted within the aperture 68. The flange 64 is sized to be approximately the same diameter as the lip of the neck of the recovery container 24. In this manner, when a container 24 is threaded into port 20 the lip contacts the flange 64 and moves it vertically upward. This in turn raises the ball 62, thus creating a passage for fluid to exit through the aperture 68. The flange 64 preferably has a set of openings to permit fluid to pass through into the recovery container 24. Alternatively, the flange 64 can be solid, but with spacers or ribs on the top side to maintain a gap between the flange 64 and the aperture 68. When the container 24 is removed, the ball 62 drops and closes off the aperture 68. In this way there can be fluid remaining in the device 10 and a user will not leak fluid when changing recovery containers.

Secure mounting of the device 10 to a wall by means of a brace and plate with apertures allows for rugged treatment of the device 10, such as when in a mechanics shop, when containers 12 often may be hurriedly jammed in the device 10 with little concern for gentle treatment. The present invention is designed to withstand such use and be securely held in place, such as on a shop wall. As a matter of practicality a number of the devices 10 can be mounted on a wall, each for a different type or grade of oil, and labeled accordingly.

While the invention has been described in connection with certain preferred embodiments, it is not intended to limit the scope of the invention to the particular forms set forth, but, on the contrary, it is intended to cover such alternatives, modifications, and equivalents as may be included within the spirit and scope of the invention as defined by the appended claims.

I claim:

1. A device for simultaneously recovering fluid from at least one container, comprising:
   (a) a funnel member having an open upper portion, a narrower lower portion, and side wall portions connecting said upper and said lower portions, and wherein at least part of said side wall portions are generally vertical and part of said side wall portions slope inwardly;
   (b) an outlet port defined by said lower portion, said port having a set of threads capable of removably receiving a recovery container having mating threads;
   (c) a cover closing said open upper portion and having at least one opening defined therein;

(d) at least one retainer means mounted on said cover for releasably holding said container, comprising a ring having side walls extending upward from said cover and wherein said opening in said cover is bound by said ring, said ring having at least one rib disposed vertically along its inner circumference for providing a pressure fit with said container and (e) means for mounting the device to a vertical surface comprising at least one support member extending generally perpendicularly outward from said wall portion and having at its distal end an elongated mounting member having at least one U-shaped opening defined therein for accepting an attaching means.

2. The device of claim 1, further comprising a removable cap for preventing entry of dirt into said retainer means that frictionally engages the outer circumference of said ring.

3. The device of claim 2, wherein said removable cap is connected to said cover by a flexible connecting tab means.

4. The device of claim 1, further comprising a valve associated with said outlet port for preventing fluid from leaking out when said recovery container is removed.

5. The device of claim 4, wherein said valve comprises, in combination, a ball, a flange, and a stem connecting said ball and flange, said valve being disposed in said outlet port such that when a recovery container is attached to said outlet port fluid may pass from said funnel member into said recovery container and when said recovery container is removed said ball will drop and close off said outlet port from further passage of fluid therethrough.

6. The device of claim 5, wherein said flange has at least one aperture defined therein for permitting passage of fluid therethrough.

7. The device of claim 1, further comprising at least one fillet disposed between and connecting said funnel member and said support member.

8. A device for simultaneously recovering fluid from at least one container, comprising:

(a) a funnel member having an open upper portion, a narrower lower portion, and side wall portions connecting said upper and said lower portions, and wherein at least part of said side wall portions are generally vertical and part of said side wall portions slope inwardly;

(b) an outlet port defined by said lower portion, said port having a set of threads capable of removably receiving a recovery container having mating threads.

(c) a valve associated with said outlet port for preventing fluid from leaking out when said recovery container is removed said valve comprising in combination a ball, a flange, wherein said flange has at least one aperture defined therein for permitting passage of fluid therethrough, and a stem connecting said ball and flange, said valve being disposed in said outlet port such that when a recovery container is attached to said outlet port fluid may pass from said funnel member into said recovery container and said recovery container is removed said ball will drop and close off said outlet port from further passage of fluid.

(d) a cover closing said open upper portion and having at least one opening defined therein;

(e) at least one retainer means mounted on said cover for releasably holding said container, comprising a ring having side walls extending upward from said cover and wherein said opening in said cover is bound by said ring, said ring having at least one rib disposed vertically along its inner circumference for providing a pressure fit with said container, (f) at least one removable cap for preventing entry of dirt into said retainer means that frictionally engages the outer circumference of said ring, wherein said removable cap is connected to said cover by a flexible connecting tab means;

(g) means for mounting the device to a vertical surface comprising at least one support member extending generally perpendicularly outward from said wall portion and having at its distal end an elongated mounting member having at least one U-shaped opening defined therein for accepting an attaching means: and (h) at least one fillet disposed between and connecting said funnel member and said support member for providing stabilization and strength to said device.

* * * * *